United States Patent [19]
Takahashi et al.

[11] Patent Number: 5,643,490
[45] Date of Patent: Jul. 1, 1997

[54] POLYMER SOLID ELECTROLYTE COMPOSITION

[75] Inventors: Kenichi Takahashi; Hiroyuki Akashi; Kazuhiro Noda; Koichi Tanaka, all of Kanagawa, Japan

[73] Assignee: Sony Corporation, Tokyo, Japan

[21] Appl. No.: 655,558

[22] Filed: May 30, 1996

Related U.S. Application Data

[63] Continuation-in-part of Ser. No. 323,078, Oct. 14, 1994, abandoned.

[30] Foreign Application Priority Data

Oct. 21, 1993  [JP]  Japan .................................. 5-287605

[51] Int. Cl.$^6$ ........................... H01M 6/18; H01M 10/40
[52] U.S. Cl. ........................... 252/62.2; 429/192
[58] Field of Search ........................... 252/62.2; 429/192, 429/193, 198, 199, 200, 189, 191

[56] References Cited

U.S. PATENT DOCUMENTS

| | | | |
|---|---|---|---|
| 3,551,211 | 12/1970 | Grulke | 252/62.2 |
| 5,378,381 | 1/1995 | Takashi et al. | 252/62.2 |

FOREIGN PATENT DOCUMENTS

| | | | |
|---|---|---|---|
| 56-103873 | 8/1981 | Japan . | |
| 5-258607 | 10/1993 | Japan | 252/62.2 |
| 7-118480 | 5/1995 | Japan . | |

*Primary Examiner*—Alan D. Diamond
*Attorney, Agent, or Firm*—Hill, Steadman & Simpson

[57] ABSTRACT

The invention is to obtain a polymer solid electrolyte composition which is free from electronic conduction and which has a high ionic conductivity even at temperatures near to room temperature and has good film-forming properties, mechanical strength and flexibility. The composition comprises an organic polymer having an alkyl quaternary ammonium salt structure, a nitrogen-containing, heterocyclic quaternary ammonium salt and a metal salt. The organic polymer preferably has an alkyl quaternary ammonium salt structure at the end of the side chain of the polymer or in the main chain thereof, such as polydimethylaminoethyl methacrylate methyl chloride quaternary salt, polydimethylaminopropylmethacrylamido methyl chloride quaternary salt, poly(N,N-dimethyl-3-pyrrolinium chloride), etc. The nitrogen-containing, heterocyclic quaternary ammonium salt (e.g., alkylpyridinium halides) and the metal salt (e.g., aluminium halides) form a cold-melting salt.

9 Claims, 4 Drawing Sheets

POLYMER SOLID ELECTROLYTE COMPOSITION

This application is a continuation-in-part of application Ser. No. 08/323,078, filed Oct. 14, 1994 now abandoned.

BACKGROUND OF THE INVENTION

This invention relates to a polymer solid electrolyte composition. More precisely, this invention relates to a polymer solid electrolyte composition containing a cold-melting salt and an aluminium-based conductive carrier and thus can exhibit a high ionic conductivity with good film-forming properties, mechanical strength and flexibility.

Use of solid electrolytes to constitute totally solid cells contributes to improving the reliability of the cell without leakage of the content in the cell. Since the cell can be made thin and a plurality of cells may be built up, attention has been directed to solid electrolytes for use as a material in the fields of cells and other electrochemical devices.

The characteristic properties as a solid electrolyte generally include (a) a high ionic conductivity without involving any electron conductivity, (b) good film-forming properties by which a thin film can be formed, and (c) good flexibility.

Broadly, solid electrolytes can be divided into two groups including an inorganic group and an organic group. The inorganic solid electrolytes have a relatively high ionic conductivity but are poor in the mechanical strength because they are crystalline in nature. This makes it difficult to obtain flexible films. This is very disadvantageous when inorganic solid electrolytes are applied to devices.

In contrast, polymer solid electrolytes made of organic materials are able to form flexible thin films. The thus-formed thin film is imparted with good mechanical properties owing to the flexibility inherent to polymers. The thin film consisting of the polymer solid electrolyte can be appropriately adapted for the volumetric variation caused by the ion-electron exchange reaction between the electrode and the polymer solid electrolyte. For these reasons, the polymer solid electrolytes have been expected as a promising solid electrolyte material for high energy density cells, particularly, thin cells.

Composite materials comprising polyethylene oxide ((—$CH_2CH_2O$—)$_n$, hereinafter referred to as PEO) having a polyether structure and alkali metal salts such as Li salts, Na salts and the like are known as polymer solid electrolytes which exhibit a high alkali metal ionic conductivity. Various types of polymer solid electrolytes including the above-mentioned composite materials have been theoretically studied with respect to their mechanisms of ionic conduction and their molecular structures. Extensive studies have also been made on the application of the polymer solid electrolytes to electrochemical devices such as cells.

The ionic conduction of polymer solid electrolytes is now considered to occur in the following manner: the alkali metal salt in the polymer matrix selectively ionizes the amorphous sites in the polymer matrix and moves by diffusion along the electric field in the matrix thereby achieving the ionic conduction while interacting with the coordinating atoms in the polymer. For instance, it has now been accepted that with composite films made of PEO and alkali metal salts, the alkali metal ions interact with the oxygen atom at the ether bond of the main chain of the polymer which has a high dielectric constant, while the molecule chain of the polymer suffers the segment movement by means of the heat at its amorphous sites, thereby showing the ionic conductivity.

However, the polymer solid electrolytes have a problem in that they are smaller in the ionic conductivity in the vicinity of room temperature than solid electrolytes made of inorganic materials. In addition, the improvements in the ionic conductivity of the polymer solid electrolytes brings about a problem in that their film-forming properties and flexibility are lowered instead.

For instance, with the composite material film consisting of PEO and alkali metal salts wherein the composite material has a molecular weight of about 10,000, good film-forming properties are obtained with an ionic conductivity being as high as $10^{-3}$ to $10^{-4}$ S/cm at temperatures of 100° C. or higher. Since the composite material is crystalline in nature, however, its ionic conductivity abruptly lowers at temperatures not higher than 60° C. and is decreased to a very small value of not higher than approximately $10^{-7}$ S/cm at room temperatures. This disenables the composite material film consisting of PEO and alkali metal salts to be used as a material for ordinary cells which are employed at room temperature.

In order to improve the ionic conductivity of the composite material film, an attempt has been made to suppress its crystallinity by making PEO react with toluene diisocyanate (TDI) in the manner shown by the following formula (5), thereby forming urethane-crosslinked structures at the terminal OH groups of PEO.

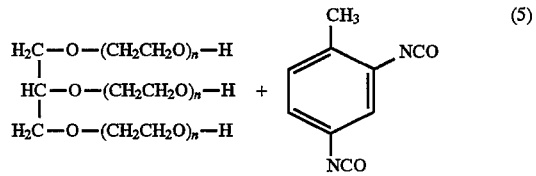

$$H_2C-O-(CH_2CH_2O)_n-H$$
$$HC-O-(CH_2CH_2O)_n-H \quad +$$
$$H_2C-O-(CH_2CH_2O)_n-H$$

In addition, another attempt has been made also to suppress the crystallinity of the composite material film by crosslinking PEO with esters. The formation of such crosslinked structures is effective as the means for improving the mechanical characteristics of the composite material film itself without significantly lowering the ionic conductivity of the amorphous polymer in the film. Even by such means, however, the improvement in the ionic conductivity of the composite material film is not as yet satisfactory.

On the other hand, the ionic conductivity of the composite material film at temperatures in the vicinity of room temperature can be improved by making the molecular weight of PEO, which is the polymer constituting the film, lower than 10,000. In this case, however, the film-forming properties of the composite material are considerably lowered, making it difficult to form a film from the material.

Moreover, for improving the ionic conductivity of the composite material film, the concentration of the alkali metal salts therein may be increased. However, this will cause the glass transition point, Tg, of the composite material film to increase, thus rather resulting in lowering of the ionic conductivity of the film. As will be apparent from the foregoing, it is not possible to increase both the carrier density and the ionic conductivity of the composite material film.

Other types of polymer solid electrolytes are known, which are similar to the above-mentioned composite materials consisting of PEO and alkali metal salts, but containing an acrylic or methacrylic, organic high polymer having a PEO structure at its side chain, as shown by the following formula (6):

wherein m and n each are a desired integer. In addition, also known are still other types of polymer solid electrolytes which contain a polyphosphazenic, organic polymer having PEO structures as its side chains and having —P=N— as its main chain, as shown by the following formula (7):

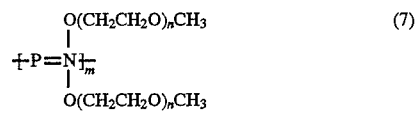

wherein m and n each are a desired integer; as well as those which contain a siloxanic, organic polymer having a PEO structure at its side chain and having —SiO— as its main chain, as shown by the following formula (8):

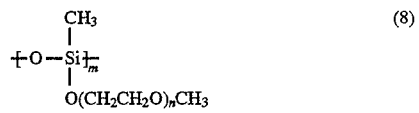

wherein m and n each are a desired integer.

These polymer solid electrolytes comprising such organic polymers and alkali metal salts have an ionic conductivity ranging from $10^{-5}$ to $10^{-4}$ S/cm and are thus slightly improved over the composite material consisting of PEO and alkali metal salts. However, this ionic conductivity is not satisfactory in practical applications. In addition, their film-forming properties and flexibility are not satisfactory.

On the other hand, attention has been paid to lithium metal secondary cells, lithium ion secondary cells and nickel hydrogen secondary cells for use as high-capacitance cells. Now, there is a strong demand for developments of materials for secondary cells which are small in size, light in weight and high in capacitance, with the recent popularization of portable appliances. One of newly developing cells of such kinds has an anode made of aluminium metal. Theoretically, cells having an anode made of aluminium metal are assumed to have a possibility capable of realizing a high density capacitance which is as high as four times per volume that of conventional lithium ion secondary cells. The production costs for such aluminium cells may be lowered. In view of these, cells having an anode made of aluminium metal are considered promising ones.

However, no practical electrolytic cells have heretofore been known, in which the cell system is composed of an anode made of aluminium metal and an electrolytic solution. The reasons are considered to be the following (a) and (b):

(a) Thermodynamically, aluminium is much more hardly reduced than hydrogen, so that the electrochemically-reversible reaction of aluminium in an aqueous electrolytic solution cannot be expected. For this reason, a non-aqueous cell must be constructed if aluminium is desired to be used as the anode therein.

(b) Since the surface of aluminium has a highly-insulating, firm and dense, passivated oxide film thereon, the dissolution of aluminium by discharging is extremely difficult so that the discharging characteristics of the cell having aluminium as its anode are lowered. In addition, the precipitation of aluminium by charging is also difficult because of the same reason so that the charging characteristics of the cell are also lowered.

On the other hand, to obtain secondary cells which are small-sized and light-weight while having high capacitance, attention has been paid to new materials for cells such as those mentioned below. For instance, a report has been made, stating that certain types of pyridinium or imidazolium quaternary ammonium salts and aluminium chloride can form molten salts at room temperature (cold-melting salts) at certain constitutive ratios and the salts exhibit a very high ionic conductivity. The reported system has been specifically noted and studied as an electrolytic solution for cells. However, the system still has a problem in that the cells using this can function only at elevated temperatures so that these cannot be put to practical use at room temperature or at temperatures lower than room temperature.

SUMMARY OF THE INVENTION

This invention is to solve the problems of the conventional polymer solid electrolytes, and its object is to provide a polymer solid electrolyte composition which is free from electronic conduction, which exhibits a high ionic conductivity even at temperatures near to room temperature and which has good film-forming properties, mechanical strength and flexibility. More particularly, in view of the above-mentioned facts that cold-melting salts are still advantageous as electrolytes in cells though having a problem with respect to the conductivity of the cells having them at room temperature and that electrolytic cells having an anode made of aluminium metal are considered advantageous as high-density cells though being just brought under development, it is an object of this invention to develop a material system capable of forming a molten salt at room temperature into a polymer solid system which can exhibit, as it is, the ionic liquid properties of the molten salt, thereby obtaining a polymer solid electrolyte composition comprising, along with the thus-developed polymer solid system, aluminium carrier ions capable of realizing high-density ionic conduction.

In order to attain the above-mentioned object, we, the present inventors studied organic polymers capable of constituting polymer solid electrolytes, which can contain high-density carrier ions, which have functional groups capable of adequately interacting with the carrier ions, which can maintain their amorphous state even at low temperatures to thereby ensure sufficient segment motion and which are free from electronic conduction, and, as a result, have found that organic polymers having an alkyl quaternary ammonium salt structure satisfy the requirements and additionally have found that polymer solid electrolytes comprising such an organic polymer having an alkyl quaternary ammonium salt structure and a cold-melting salt composed of a nitrogen-containing, heterocyclic quaternary ammonium salt, such as alkylpyridinium quaternary ammonium halides, etc., and a metal salt, such as aluminium halides, etc., in such a way that the organic polymer has captured the cold-melting salt therein are effective. Based on these findings, we, the present inventors have completed this invention.

Specifically, this invention provides a polymer solid electrolyte composition comprising an organic polymer having an alkyl quaternary ammonium salt structure, a nitrogen-containing, heterocyclic quaternary ammonium salt, and a metal salt.

This invention also provides a method for producing a polymer solid electrolyte film, in which an organic polymer having an alkyl quaternary ammonium salt structure, a nitrogen-containing, heterocyclic quaternary ammonium salt and a metal salt are dissolved in an organic solvent and then filmed by casting.

DETAILED DESCRIPTION OF THE INVENTION

Figure 1:
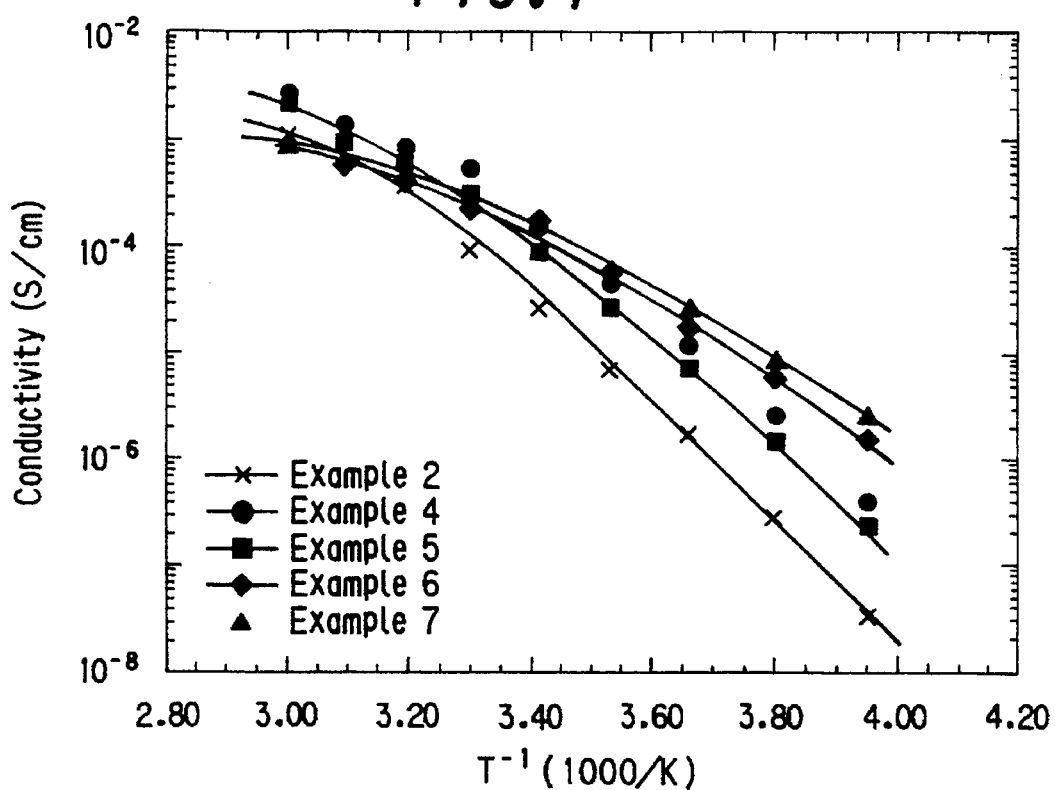
FIG. 1 shows the temperature-dependent variation in the conductivity of the polymer solid electrolyte films obtained in the examples mentioned hereafter.

The polymer solid electrolyte composition of this invention comprises, as essential constitutive components, three components of an organic polymer having an alkyl quaternary ammonium salt structure, a nitrogen-containing, heterocyclic quaternary ammonium salt and a metal salt.

The organic polymer to be used as one component constituting the polymer solid electrolyte composition of this invention shall have an alkyl quaternary ammonium salt structure. Preferred examples of such organic polymers are those having, at the ends of the side chains, pendant alkyl quaternary ammonium groups of the following formula (1) or (2):

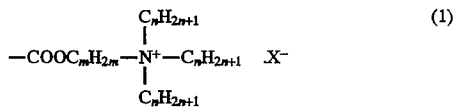

wherein m is an integer of from 1 to 3, n is an integer of from 1 to 4, and $X^-$ is a counter anion, or

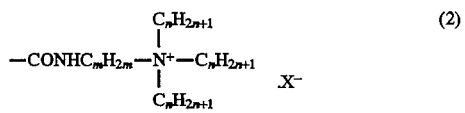

wherein m is an integer of from 1 to 3, n is an integer of from 1 to 4, and $X^-$ is a counter anion.

The backbone structure of the polymer is not specifically defined. The counter anion $X^-$ in the alkyl quaternary ammonium group is preferably $Cl^-$, $Br^-$ or $I^-$.

Such organic polymers may be obtained as homopolymers from vinyl monomers having the alkyl quaternary ammonium salt structure of formula (1) or (2), or as copolymers from such vinyl monomers and other vinyl comonomers. Examples of the homopolymers from vinyl monomers having the alkyl quaternary ammonium salt structure of formula (1) are those of the following formula (9):

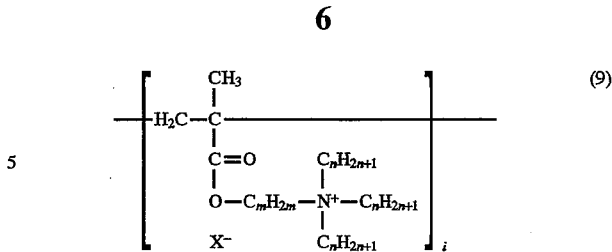

wherein m is an integer of from 1 to 3, n is an integer of from 1 to 4, $X^-$ is a counter anion, and i is a desired integer. Of these, preferred are homopolymers from dimethylaminoethyl methacrylate methyl chloride quaternary ammonium salt (hereinafter referred to as DAEC) corresponding to formula (1) wherein m=2, n=1 and $X^-=Cl^-$. Examples of the homopolymers from vinyl monomers having the alkyl quaternary ammonium salt structure of formula (2) are those of the following formula (10):

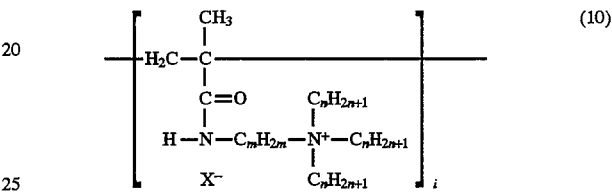

wherein m is an integer of from 1 to 3, n is an integer of from 1 to 4, $X^-$ is a counter anion, and i is a desired integer. Of these, preferred are homopolymers from dimethylaminopropylmethacrylamido methyl chloride quaternary salt (hereinafter referred to as DAPC) corresponding to formula (2) wherein m=3, n=1 and $X^-=Cl^-$.

Examples of the copolymers from vinyl monomers having the alkyl quaternary ammonium salt structure of formula (1) and other vinyl comonomers are those of the following formula (11):

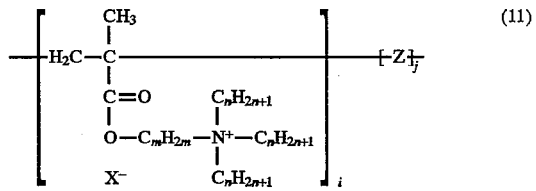

wherein m is an integer of from 1 to 3, n is an integer of from 1 to 4, $X^-$ is a counter anion, i and j each are a desired integer, and Z is a polymer constitutive unit from the copolymerized vinyl comonomer.

Examples of the copolymers from vinyl monomers having the alkyl quaternary ammonium salt structure of formula (2) and other vinyl comonomers are those of the following formula (12):

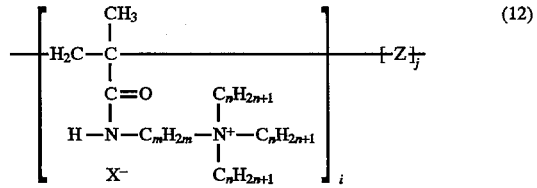

wherein m is an integer of from 1 to 3, n is an integer of from 1 to 4, $X^-$ is a counter anion, i and j each are a desired integer, and Z is a polymer constitutive unit from the copolymerized vinyl comonomer.

As the vinyl comonomers to give the polymer constitutive unit Z in the copolymers of formulae (11) and (12), preferred are those having vinylic unsaturated hydrocarbons. Specific examples of the comonomers having vinylic unsaturated hydrocarbons include acrylic monomers (e.g., $CH_2=CHCOOH$, $CH_2=CHCOOR$ where R is an alkyl group, $CH_2=CHCOOM$ where M is an alkali metal, $CH_2=CHCOO(CH_2CH_2O)_nCH_3$ where n is an integer of from 1 to 23, etc.), methacrylic monomers (e.g., $CH_2=CCH_3COOH$, $CH_2=CCH_3COOR$ where R is an alkyl group, $CH_2=CCH_3COO(CH_2CH_2O)_nCH_3$ where n is an integer of from 1 to 23, etc.), as well as $CH_2=[COO(CH_2CH_2O)_nCH_3]_2$ where n is an integer of from 1 to 23, $CH_2=CH(C_6H_5)$, $CH_2=CHCN$, $CH_2=CHCONH_2$, vinyl chloride, vinyl pyrrolidone, etc.

To obtain the copolymers, one or more of the above-mentioned vinyl comonomers may be used.

Where the copolymers are prepared by copolymerizing vinyl monomers having an alkyl quaternary ammonium salt structure, such as DAEC, DAPC, etc., and other vinyl comonomers such as those mentioned above, the constitutive ratios of the monomers may be changed, by which the resulting copolymers may have the characteristics of all the constitutive monomers. In this way, it is possible to desirably control the physical and chemical properties of the copolymers to be used as the organic polymers in the present invention. For instance, if the content of methyl acrylate or methyl methacrylate is increased, the resultant copolymer is lowered in its moistureproofing in comparison with the homopolymers from DAEC or DAPC. If the content of the methacrylic monomer having a polyether structure at its side chain is increased, the resultant copolymer has a reduced degree of crystallinity, while having, on the contrary, an increased degree of flexibility, with the result that the copolymer is to have good filming properties preferable for the polymer solid electrolyte composition of this invention.

When the organic polymer is obtained as the copolymer from vinyl monomers having the alkyl quaternary ammonium salt structure of formula (1) or (2) and other vinyl comonomers, the ratio between the former vinyl monomers and the latter vinyl comonomers is preferably such that the former vinyl monomers such as DAEC, DAPC, etc. are 50 mol % or more, especially preferably 90 mol % or more. In general, if the former vinyl monomers having the alkyl quaternary ammonium salt structure of formula (1) or (2) are less than 50 mol %, the ionic conductivity of the polymer solid electrolyte composition containing such copolymers is lowered.

The copolymerization to obtain the copolymers may be conducted by any known process such as a radical polymerization process, a photopolymerization process or the like. According to any of these processes, the resulting copolymers have such monomer ratios as those initially charged for the copolymerization.

The organic polymer to be used in preparing the polymer solid electrolyte composition of this invention may also be a polymer blend comprising the homopolymers of the above-mentioned DAEC, DAPC, etc. and the copolymers from such monomers and other vinyl comonomers and optionally still other polymers compatible with these homopolymers and copolymers.

In addition to the above-mentioned organic polymers, other organic polymers composed of monomer units where an alkyl quaternary ammonium salt structure is bonded to the main chain of the polymer to form a cyclic structure therein may also be used preferably as the organic polymer constituting the polymer solid electrolyte composition of this invention. As examples of such organic polymers, mentioned are those comprising units of the following formula (3):

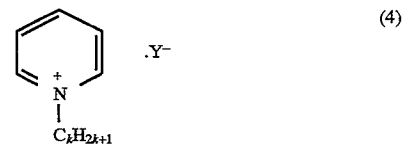

wherein $R^1$ and $R^2$ each are a lower alkyl group, $X^-$ is a counter anion, and i is a desired integer.

The counter anion $X^-$ existing in the alkyl quaternary ammonium salt structure in these organic polymers is preferably $Cl^-$, $Br^-$ or $I^-$. These organic polymers may be obtained by polymerization of diallyl dialkyl ammonium halide monomers in accordance with methods well-known to those skilled in this art, as well from commercial sources.

Of such organic polymers of formula (3), one preferred example comprises (N,N-dimethyl-3-pyrrolinium chloride) units (hereinafter referred to as PDMPC) wherein $R^1=R^2=CH_3$ and $X^-=Cl^-$, which is a homopolymer containing N,N-dimethyl-3-pyrrolinium chloride units (hereinafter referred to as DMPC) and derived from diallyl dimethyl ammonium chloride (DADMAC) monomer units. PDMPC preferably has a mean molecular weight of from 20,000 to 500,000. In particular, preferred is a polymer solid electrolyte composition comprising PDMPC having a mean molecular weight of about 500,000, as the organic polymer, butylpyridinium chloride of an alkylpyridinium salt which will be described in detail hereinafter and is represented by the following formula (4):

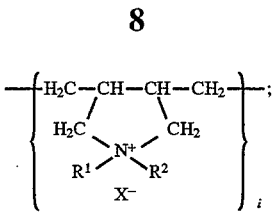

wherein k is 4 and Y— is Cl—, as the nitrogen-containing, heterocyclic quaternary ammonium salt, and $AlCl_3$ as the metal salt, provided that the ratio of these constitutive components is such that the DMPC unit content is from 5 to 20 mol %, the butylpyridinium chloride content is from 25 to 50 mol % and the $AlCl_3$ content is from 30 to 70 mol %, as this has a high ionic conductivity and good film-forming properties.

The polymer solid electrolyte composition of this invention contains, in addition to the above-mentioned organic polymer, a nitrogen-containing, heterocyclic quaternary ammonium salt as its constitutive component. The nitrogen-containing, heterocyclic quaternary ammonium salt to be in the composition is one which may form a cold-melting salt with a metal salt such as aluminium halides, etc. Preferred examples of the nitrogen-containing, heterocyclic quaternary ammonium salt are alkylpyridinium salts of the following formula (4):

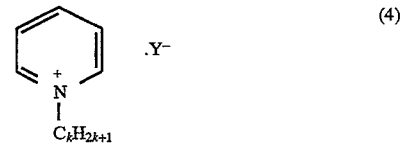

wherein k is an integer of from 1 to 4, and Y_ is a counter anion;

and alkylimidazolium salts of the following formula (13):

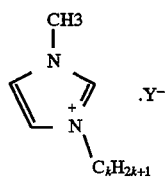

wherein k is an integer of from 1 to 4, and Y_is a counter anion; and also their derivatives to be formed by introducing substituent(s) thereinto. Of these alkylpyridinium salts and alkylimidazolium salts, preferred are those of the foregoing formulae where the counter anion is Cl$^-$, Br$^-$ or I$^-$.

The polymer solid electrolyte composition of this invention contains a metal salt as its constitutive component. As the metal salt, preferred are aluminium halides such as AlCl$_3$, AlBr$_3$, AlI$_3$, etc. The kind of the halide anions of the aluminium halide need not always be the same as that of the counter anion of the above-mentioned alkyl quaternary ammonium salt structure. The composition of this invention may contain one or more of these metal salts.

The preferred ratio between the organic polymer and the metal salt constituting the polymer solid electrolyte composition of this invention varies, depending on the kind of the metal salt and that of the organic polymer. In general, however, when the organic polymer of any of formulae (9) to (12), which has an alkyl quaternary ammonium salt structure at the terminal of its side chain, is used, it is preferred that the ratio of the metal salt is 2 mols or less, especially preferably from 0.1 to 2 mols, to one mol of the alkyl quaternary ammonium salt structure. On the other hand, when the organic polymer of formula (3) where an alkyl quaternary ammonium salt structure has been bonded to the main chain of the polymer to form a cyclic structure therein is used, it is preferred that the ratio of the metal salt is 0.5 mols or more, especially preferably from 1 to 15 mols, to one mol of the alkyl quaternary ammonium salt structure. If the ratio of the organic polymer to the metal salt falls outside these ranges, the polymer solid electrolyte composition containing them will have a reduced conductivity and poor film-forming properties.

The ratio between the nitrogen-containing, heterocyclic quaternary ammonium salt and the metal salt constituting the polymer solid electrolyte composition of this invention is preferably such that the ratio of the metal salt is generally from 0.3 to 0.9 mols, especially preferably from 0.5 to 0.8 mols, to one mol of the sum of these two.

The polymer solid electrolyte composition of this invention may be produced by ordinary methods. For instance, to produce the composition, the organic polymer, the nitrogen-containing, heterocyclic quaternary ammonium salt and the metal salt may be uniformly dissolved in a solvent. The polymer solid electrolyte of this invention is generally utilized in the form of a film. The electrolyte may be formed into a film also by ordinary methods. For instance, to obtain a film of the polymer solid electrolyte by a casting method, the organic polymer, the nitrogen-containing, heterocyclic quaternary ammonium salt and the metal salt are dissolved in an organic solvent, and the resulting solution is spread over a flat substrate whereupon the solvent is evaporated out. As the casting solvent, preferably used are lower alcohols, nitromethane, etc.

It is considered that, in the polymer solid electrolyte composition of this invention, the metal salt such as aluminium halides, etc. forms a complex with the the counter anion of the alkyl quaternary ammonium salt of the organic polymer or that of the nitrogen-containing, heterocyclic quaternary ammonium salt, thereby forming a metal complex having a quasi-tetrahedral structure such as (AlX$_4$)$^-$, etc. It is also considered that, in the polymer solid electrolyte composition of this invention, a metal complex having a dimeric quasi-tetrahedral structure having one common counter ion therein, such as (Al$_2$X$_7$)$^-$, is also formed, depending on the ratios of the constitutive components therein, and the both metal complexes are in an equilibrated condition. It is considered that these complex ions act as carrier ions, thereby exhibiting the ionic conductivity. Therefore, where an aluminium halide is used as the metal salt in this invention, the polymer solid electrolyte composition may have a significantly higher ionic conductivity than the conventional lithium-based, ion-conductive polymer solid electrolytes so that the former may realize cells having a high-density capacitance.

Further, even if the polymer solid electrolyte composition of this invention contains the metal salt, such as aluminium halides, etc., serving as carrier ions at a high concentration, its film-forming properties are not worsened and its conductivity is not abruptly lowered owing to the elevation of its glass transition point, Tg. Accordingly, the composition of this invention, if containing carrier ions at a high concentration, may have an elevated ionic conductivity while maintaining its good film-forming properties and flexibility.

In addition, in the polymer solid electrolyte composition of this invention, since the nitrogen-containing, heterocyclic quaternary ammonium salt reacts with the metal salt to form a cold-melting salt, the composition may have an elevated ionic conductivity. For instance, the composition may have an ionic conductivity of from $10^{-4}$ to $10^{-3}$ S/cm even at room temperature.

This invention will be described more concretely by means of the following examples.

REFERENTIAL EXAMPLE 1

Production of Organic Polymers A and B (Homopolymers of DAEC and DAPC):

DAEC or DAPC was charged into a sealable glass ampule having a capacity of about 20 ml, along with 4 mg of azobisisobutyronitrile (AIBN) as a radical polymerization initiator. The ampule was connected with a nitrogen-substituting device, which was then subjected to a series of operation comprising vacuum degassing, nitrogen introduction and melting, repeatedly three times, using a dry ice/methanol bath, and was finally sealed in high vacuum. Next, the thus-sealed ampule was set in a shaking thermostat and the reactants therein were polymerized at 65° C. for 24 hours. Accordingly, a highly-viscous reaction liquid was obtained. The thus-obtained reaction liquid was cooled to room temperature, the ampule was opened, and the liquid was dissolved in methanol. The resulting solution was poured into acetone in an amount of 20 times greater than the solution, while stirring. Accordingly, a white, fibrous solid was obtained. The thus-obtained white solid was purified by re-precipitating it in methanol/acetone, repeatedly two or three times. The thus-purified product was then dried under reduced pressure. As a result, the intended PDAEC or PDAPC was obtained at an yield of from 20 to 40%. The organic polymer was identified by FT-IR or $^1$H-NHR in CDCl$_3$, by which it was confirmed to be the intended organic polymer.

The same process as above was repeated, using benzoyl peroxide (PBO) as the radical polymerization initiator in place of azobisisobutyronitrile (AIBN), and the intended organic polymers were also obtained.

REFERENTIAL EXAMPLE 2

Production of Organic Polymers C to H (Copolymers):

Into a sealable glass ampule having a capacity of about 20 ml, the following:

(i) DAEC or DAPC, (ii) methacrylate monomer having a polyether structure at its side chain ($CH_2=CCH_3(COO(CH_2CH_2O)_4CH_3)$) (hereinafter referred to as PEM4) or $CH_2=CCH_3$ ($COO(CH_2CH_2O)_9CH_3$) (hereinafter referred to as PEM9), and (iii) methyl methacrylate (MMA), were charged at the monomer ratio (by mol %) shown in Table 1, and azobisisobutyronitrile (AIBN) was added thereto in an amount of from 0.2 to 1.0 mol % relative to the mols of all the monomers charged. Then, these were stirred to form a uniform solution. Afterwards, the resulting solution was processed in the same manner as in the above for producing the homopolymer of DAEC or DAPC. As a result, the intended copolymers were obtained at an yield of from 30 to 40%. The monomer compositions of the thus-obtained organic polymers were identified by $^1$H-NMR in $CDCl_3$, revealing that they correspond to the ratios of the charged monomers.

The same process as above was repeated, using benzoyl peroxide (PBO) as the radical polymerization initiator in place of azobisisobutyronitrile (AIBN), and the intended organic polymers were also obtained.

TABLE 1

| Monomer Compositions of Organic Polymers (mol %) | | | | | |
|---|---|---|---|---|---|
| | DAEC | DAPC | PEM4 | PEM9 | MMA |
| Organic Polymer A | 100 | | | | |
| Organic Polymer B | | 100 | | | |
| Organic Polymer C | 95 | | 5 | | |
| Organic Polymer D | 90 | | 10 | | |
| Organic Polymer E | 95 | | | 5 | |
| Organic Polymer F | 95 | | | | 5 |
| Organic Polymer G | | | 95 | 5 | |
| Organic Polymer H | | | 90 | 10 | |

REFERENTIAL EXAMPLE 3

Production of Nitrogen-containing, Heterocyclic Quaternary Ammonium Salt (butylpyridinium chloride):

Pyridine and excess n-butyl chloride were heated under reflux in nitromethane for 24 hours and then cooled, and the reaction solution was poured into dioxane, thereby precipitating the crystals formed. Thus, crude crystals of butylpyridinium chloride (BPC) were obtained. These were purified by recrystallizing them in methanol/dioxane solvent two or three times and then fully dried in vacuum.

REFERENTIAL EXAMPLE 4

Pre-treatment of Metal Salt (aluminium halide):

Aluminium halide having a purity of 99.99% (made by Ko-jundo Kagaku KK) was dried in vacuum just before its use.

EXAMPLES 1 to 38

(a) Formation of Polymer Solid Electrolyte Films:

PDAEC (Organic Polymer A) obtained in the above-mentioned Referential Example 1 was added to a fully-dewatered ethanol and then well stirred to prepare a uniform solution.

On the other hand, aluminium chloride ($AlCl_3$) pre-treated in Referential Example 4 was added to butylpyridinium chloride (BPC) obtained in Referential Example 3, little by little, while stirring, at the molar ratio mentioned below.

Molar Ratio of BPC to $AlCl_3$:

| Examples 1 to 8: | [BPC]:[AlCl$_3$] = 3:7 |
|---|---|
| Examples 9 to 15: | [BPC]:[AlCl$_3$] = 4:6 |
| Examples 16 to 20: | [BPC]:[AlCl$_3$] = 2:8 |
| Examples 21 to 26: | [BPC]:[AlCl$_3$] = 1:9 |
| Examples 27 to 32: | [BPC]:[AlCl$_3$] = 6:4 |
| Examples 33 to 38: | [BPC]:[AlCl$_3$] = 7:3 |

After the two were blended, the resulting mixture was liquefied to form a molten salt. The molten salt was added to the above-mentioned ethanol solution of PDAEC (Organic Polymer A), little by little, while cooling on a dry ice/methanol bath and stirring, and the stirring of the resulting mixture was continued further until the mixture became completely dissolved to give a uniform solution. To form the uniform solution, the alkyl quaternary ammonium salt unit ($—NR_3Cl$) of the organic polymer or, that is, the DAEC unit and the ratio between BPC and $AlCl_3$ constituting the molten salt were defined to those as indicated in Table 2 below.

Subsequently, the solution was passed through a filter with a pore size of 0.45 µm to remove the impurities therefrom, and then filmed by casting. Precisely, the solution was placed in a Teflon disk with a flat bottom, and the solvent was evaporated from the solution in a dry nitrogen atmosphere in a thermostat set at 40° to 60° C. Thereafter, this was heated in vacuum to completely remove the solvent therefrom and dried to obtain a polymer solid electrolyte film having a thickness of approximately from 50 to 200 µm. The filming process was totally conducted in dry air or an inert gas atmosphere.

TABLE 2

| | PDAEC/BPC/AlCl$_3$ Polymer Solid Electrolyte Films | | | | |
|---|---|---|---|---|---|
| | —NR$_3$Cl unit (mmol) | BPC (mmol) | AlCl$_3$ (mmol) | BPC/AlCl$_3$ | Condition of Film |
| Example 1 | 1.00 | 0.043 | 0.10 | 3/7 | transparent, vitreous film |
| Example 2 | 1.00 | 0.129 | 0.30 | 3/7 | transparent, flexible, self-supporting film |
| Example 3 | 1.00 | 0.214 | 0.50 | 3/7 | transparent, flexible, self-supporting film |

TABLE 2-continued

PDAEC/BPC/AlCl₃ Polymer Solid Electrolyte Films

| | —NR₃Cl unit (mmol) | BPC (mmol) | AlCl₃ (mmol) | BPC/AlCl₃ | Condition of Film |
|---|---|---|---|---|---|
| Example 4 | 1.00 | 0.300 | 0.70 | 3/7 | transparent, flexible, self-supporting film |
| Example 5 | 1.00 | 0.428 | 1.00 | 3/7 | transparent, flexible, self-supporting film |
| Example 6 | 1.00 | 0.857 | 2.00 | 3/7 | milky, sticky, gel-like film |
| Example 7 | 1.00 | 1.290 | 3.00 | 3/7 | milky, sticky, gel-like film |
| Example 8 | 1.00 | 2.140 | 5.00 | 3/7 | milky, sticky, gel-like film |
| Example 9 | 1.00 | 0.067 | 0.10 | 4/6 | transparent, vitreous film |
| Example 10 | 1.00 | 0.200 | 0.30 | 4/6 | transparent, flexible, self-supporting film |
| Example 11 | 1.00 | 0.333 | 0.50 | 4/6 | transparent, flexible, self-supporting film |
| Example 12 | 1.00 | 0.467 | 0.70 | 4/6 | transparent, flexible, self-supporting film |
| Example 13 | 1.00 | 0.667 | 1.00 | 4/6 | transparent, flexible, self-supporting film |
| Example 14 | 1.00 | 1.333 | 2.00 | 4/6 | milky, sticky, gel-like film |
| Example 15 | 1.00 | 3.333 | 5.00 | 4/6 | milky, sticky, gel-like film |
| Example 16 | 1.00 | 0.075 | 0.30 | 2/8 | transparent, vitreous film |
| Example 17 | 1.00 | 0.125 | 0.50 | 2/8 | transparent, flexible, self-supporting film |
| Example 18 | 1.00 | 0.175 | 0.70 | 2/8 | transparent, flexible, self-supporting film |
| Example 19 | 1.00 | 0.250 | 1.00 | 2/8 | transparent, flexible, self-supporting film |
| Example 20 | 1.00 | 0.500 | 2.00 | 2/8 | milky, flexible film |
| Example 21 | 1.00 | 0.011 | 0.10 | 1/9 | transparent, vitreous film |
| Example 22 | 1.00 | 0.033 | 0.30 | 1/9 | transparent, vitreous film |
| Example 23 | 1.00 | 0.056 | 0.50 | 1/9 | transparent, flexible, self-supporting film |
| Example 24 | 1.00 | 0.078 | 0.70 | 1/9 | transparent, flexible, self-supporting film |
| Example 25 | 1.00 | 0.111 | 1.00 | 1/9 | transparent, flexible, self-supporting film |
| Example 26 | 1.00 | 0.222 | 2.00 | 1/9 | milky, flexible film |
| Example 27 | 1.00 | 0.150 | 0.10 | 6/4 | transparent, vitreous film |
| Example 28 | 1.00 | 0.450 | 0.30 | 6/4 | transparent, flexible, self-supporting film |
| Example 29 | 1.00 | 0.750 | 0.50 | 6/4 | transparent, flexible, self-supporting film |
| Example 30 | 1.00 | 1.050 | 0.70 | 6/4 | transparent, flexible, self-supporting film |
| Example 31 | 1.00 | 1.500 | 1.00 | 6/4 | milky, flexible film |
| Example 32 | 1.00 | 3.00 | 2.00 | 6/4 | milky, flexible film |
| Example 33 | 1.00 | 0.233 | 0.10 | 7/3 | transparent, vitreous film |
| Example 34 | 1.00 | 0.700 | 0.30 | 7/3 | transparent, flexible, self-supporting film |
| Example 35 | 1.00 | 1.167 | 0.50 | 7/3 | transparent, flexible, self-supporting film |
| Example 36 | 1.00 | 1.633 | 0.70 | 7/3 | transparent, flexible, self-supporting film |
| Example 37 | 1.00 | 2.333 | 1.00 | 7/3 | milky, flexible film |
| Example 38 | 1.00 | 4.667 | 2.00 | 7/3 | milky, flexible film |

(b) Evaluation of Properties of Polymer Solid Electrolyte Films:

The condition of the polymer solid electrolyte films obtained in the above-mentioned (a) was visually observed at room temperature. The results have been shown in Table 2 above. From these, it is known that colorless, transparent and highly-flexible films were obtained when the composition of the cold-melting salt composed of BPC and AlCl₃ was such that the salt might be liquid at temperatures near to room temperature and when the ratio of AlCl₃ to PDAEC was such that [Al$^{3+}$]/[—NR₃Cl] was smaller than 1.

(c) Evaluation of Ionic Conductivity of Polymer Solid Electrolyte Films:

The ionic conductivity of the polymer solid electrolyte films obtained in the above-mentioned (a) was measured by the method mentioned below. Precisely, the polymer solid electrolyte film to be measured was sandwiched between platinum electrodes under pressure and left as they were under heat at 60° C. for several hours to ensure the close contact between the electrodes and the film. Afterwards, the semi-circular portion of the cell was obtained according to a constant-voltage, complex impedance method, and the conductivity of the cell was analytically calculated on the basis of the semi-circular portion.

The measurement was conducted at the stationary state of the cell, after the cell to be measured had been put in a temperature-varying thermostat device and then kept therein at a desired temperature for about 1.5 hours. The AC amplitude voltage used for the measurement was set in a range of from 30 to 100 mV, while the AC frequency zone ranged from $10^{-2}$ to $10^7$ Hz.

The analysis was conducted in such a way that plural quasi-semi-circular portions were obtained by varying the area of the electrode or the thickness of the film, to which the resistive part of the polymer solid electrolyte film contributing to the ionic conductivity of the film was made attributed.

Figure 2:
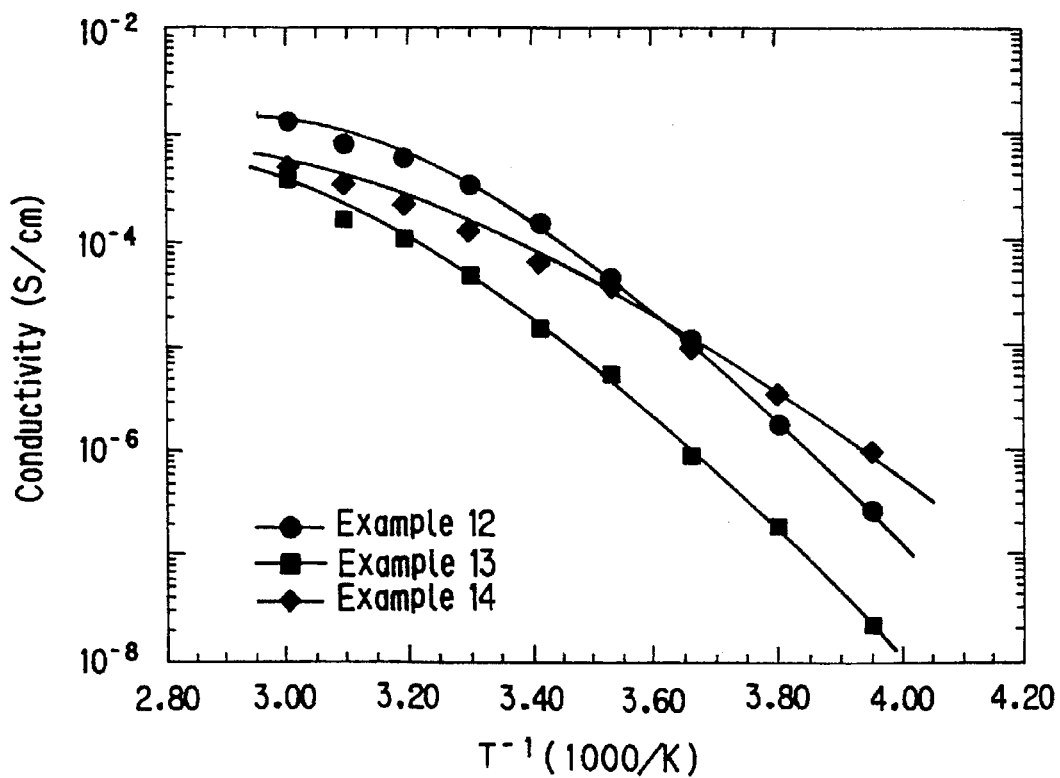
FIG. 2 shows the temperature-dependent variation in the conductivity of the polymer solid electrolyte films obtained in the examples mentioned hereafter.

For the polymer solid electrolyte films of Examples 2 and 4 to 7 in which the ratio of BPC/AlCl$_3$ was 3/7, the data of their ionic conductivities measured were plotted in an Arrhenius' diagram (1/T vs. log$\sigma$) in which the conductivity $\sigma$ in the temperature range of from $-20°$ C. to $60°$ C. was plotted relative to the reciprocal of the absolute temperature, 1/T. FIG. 1 shows the plotted results. Also for the polymer solid electrolyte films of Examples 12 to 14 in which the ratio of BPC/AlCl$_3$ was 4/6, the data of their ionic conductivities measured were plotted in the same manner. FIG. 2 shows the plotted results.

From FIG. 1, it is known that the polymer solid electrolyte films of Examples 2 and 4 to 7 in which the ratio of BPC/AlCl$_3$ was 3/7 had a high conductivity ranging from $10^{-4}$ to $10^{-3}$ S/cm at temperatures ranging near room temperature. The films of Examples 6 and 7 in which [Al$^{3+}$]/[—NR$_3$Cl] was not less than 2 were sticky, gel-like ones. Considering both the conductivity and the film-forming properties, the films of this type are preferably such that the ratio of [Al$^{3+}$]/[—NR$_3$Cl] falls approximately from 0.3 to 1.0.

From FIG. 1, it is also known that, the larger the ratio of [Al$^{3+}$]/[—NR$_3$Cl], the smaller the variation in the conductivity relative to the variation in the ambient temperature.

From FIG. 2, it is also known that the polymer solid electrolyte films of Examples 12 to 14 in which the ratio of BPC/AlCl$_3$ was 4/6 had a high conductivity ranging from $10^{-5}$ to $10^{-3}$ S/cm at temperatures ranging near room temperature. Thus, it is known that these films behave similarly to the films of Examples 2 and 4 to 7, as shown in FIG. 1.

Figure 3:
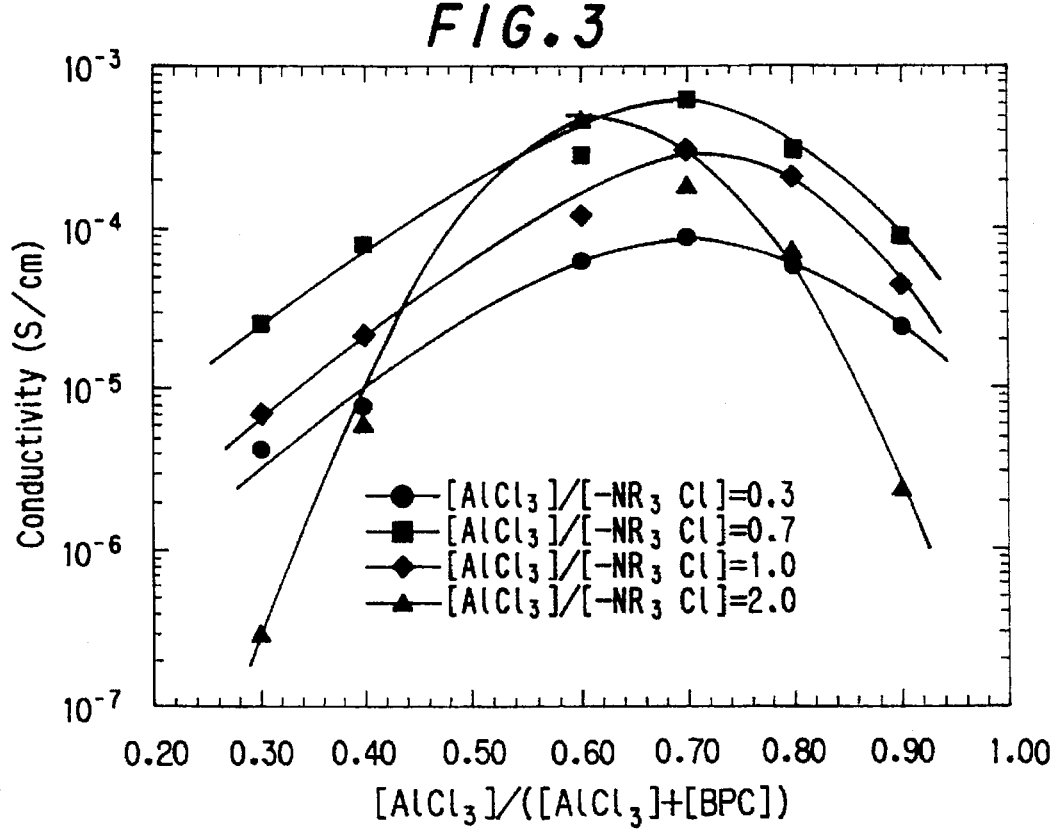
FIG. 3 shows the variation in the conductivity of the polymer solid electrolyte films obtained in the examples mentioned hereafter, relative to the proportions of PDAEC, BPC and $AlCl_3$ constituting the films.

In addition, the relationship between the proportions of PDAEC, BPC and AlCl$_3$ constituting the polymer solid electrolyte films and the conductivities of the films was clarified, by plotting the conductivities (at $30°$ C.) relative to [AlCl$_3$]/([AlCl$_3$]+[BPC]). FIG. 3 shows the plotted results.

From FIG. 3, it is known that the polymer solid electrolyte films had a high conductivity when the ratio of AlCl$_3$ to alkyl quaternary ammonium salt structure of PDAEC, [AlCl$_3$]/[—NR$_3$Cl], was within the range of from 0.3 to 1.0 and when the proportions of BPC and AlCl$_3$ constituting the cold-melting salt were such that the ratio of [AlCl$_3$]/([AlCl$_3$]+[BPC]) fell within the range of from 60 to 80%. In addition, it is also known that the films also had a high conductivity when the ratio of [AlCl$_3$]/[—NR$_3$Cl] was 2.0 and when the cold-melting salt composed of BPC and AlCl$_3$ was liquid at temperatures near to room temperatures.

EXAMPLES 39 to 52

(a) Formation of Polymer Solid Electrolyte Films:

The general procedure of Example 1 was repeated except that PDAPC (Organic Polymer B) was used in place of PDAEC (Organic Polymer A) and that the composition composed of PDAPC, BPC and AlCl$_3$ was varied to that indicated in Table 3 below, thereby forming various polymer solid electrolyte films. The molar ratio of BPC to AlCl$_3$ was as follows:

Molar Ratio of BPC to AlCl$_3$:

| Examples 39 to 42: | [BPC]:[AlCl$_3$] = 3:7 |
| Examples 43 to 46: | [BPC]:[AlCl$_3$] = 4:6 |
| Examples 47 to 49: | [BPC]:[AlCl$_3$] = 2:8 |
| Examples 50 to 52: | [BPC]:[AlCl$_3$] = 6:4 |

TABLE 3

—PDAPC/BPC/AlCl$_3$ Polymer Solid Electrolyte Films

| | —NR$_3$Cl unit (mmol) | BPC (mmol) | AlCl$_3$ (mmol) | BPC/AlCl$_3$ |
| --- | --- | --- | --- | --- |
| Example 39 | 1.00 | 0.129 | 0.30 | 3/7 |
| Example 40 | 1.00 | 0.214 | 0.50 | 3/7 |
| Example 41 | 1.00 | 0.300 | 0.70 | 3/7 |
| Example 42 | 1.00 | 0.428 | 1.00 | 3/7 |
| Example 43 | 1.00 | 0.200 | 0.30 | 4/6 |
| Example 44 | 1.00 | 0.333 | 0.50 | 4/6 |
| Example 45 | 1.00 | 0.467 | 0.70 | 4/6 |
| Example 46 | 1.00 | 0.667 | 1.00 | 4/6 |
| Example 47 | 1.00 | 0.125 | 0.50 | 2/8 |
| Example 48 | 1.00 | 0.175 | 0.70 | 2/8 |
| Example 49 | 1.00 | 0.250 | 1.00 | 2/8 |
| Example 50 | 1.00 | 0.450 | 0.30 | 6/4 |
| Example 51 | 1.00 | 0.750 | 0.50 | 6/4 |
| Example 52 | 1.00 | 1.050 | 0.70 | 6/4 |

(b) Evaluation of Properties of Polymer Solid Electrolyte Films:

The condition of the polymer solid electrolyte films obtained in the above-mentioned (a) was visually observed at room temperature. As a result, all these films were found colorless, transparent and highly flexible.

(c) Evaluation of Ionic Conductivity of Polymer Solid Electrolyte Films:

The ionic conductivity of the polymer solid electrolyte films obtained in the above-mentioned (a) was measured by the same method as in Example 1.

Figure 4:
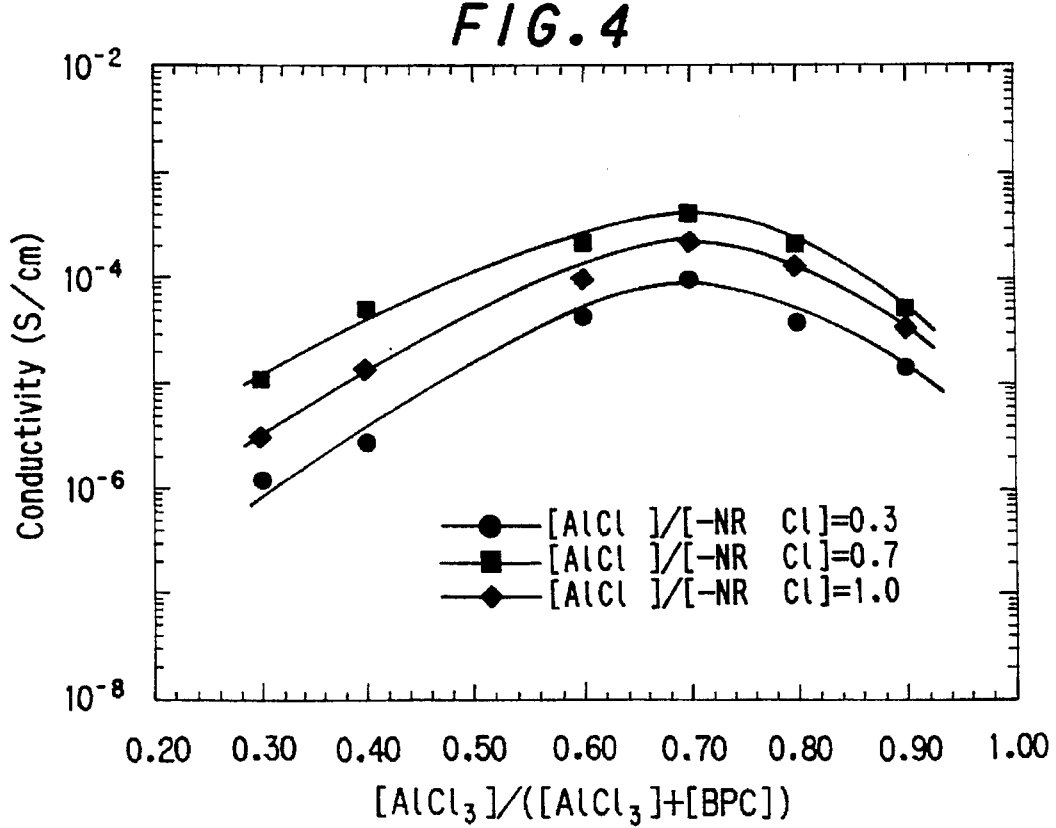
FIG. 4 shows the variation in the conductivity of the polymer solid electrolyte films obtained in the examples mentioned hereafter, relative to the proportions of PDAPC, BPC and $AlCl_3$ constituting the films.

The thus-measured ionic conductivities were plotted in the same manner as in Example 1, relative to the ratio of [AlCl$_3$]/([AlCl$_3$]+[BPC]). FIG. 4 shows the plotted results.

From FIG. 4, it is known that the ionic conductivities of the films of Examples 39 to 52 containing PDAPC as the organic polymer were sufficiently high, though being somewhat lower than those of the films of Examples 1 to 38 containing PDAEC. This means that the partial substitution of the alkyl quaternary ammonium salt structure at the side chain of the organic polymer to be contained in the polymer solid electrolyte film of this invention does not almost result in the variation in the conductivity of the film.

EXAMPLES 53 to 55

The general procedure of Example 4 was repeated except that AlBr$_3$ or AlI$_3$ was used, in place of AlCl$_3$, in the manner as indicated in Table 4, thereby forming polymer solid electrolyte films.

TABLE 4

| | Aluminium Salt AlX$_3$ | Composition (as molar ratio) —NR$_3$Cl:BPC:AlX$_3$ | Condition of Film |
| --- | --- | --- | --- |
| Example 53 | AlCl$_3$ | 1.00:0.30:0.70 | transparent, flexible, self-supporting film |

TABLE 4-continued

|  | Aluminium Salt $AlX_3$ | Composition (as molar ratio) —$NR_3Cl:BPC:AlX_3$ | Condition of Film |
|---|---|---|---|
| Example 54 | $AlBr_3$ | 1.00:0.30:0.70 | transparent, flexible, self-supporting film |
| Example 55 | $AlI_3$ | 1.00:0.30:0.70 | transparent, flexible, self-supporting film |

The condition of the polymer solid electrolyte films obtained was visually observed at room temperature. As a result, all these films were found colorless, transparent and highly flexible.

The ionic conductivity of these films at 30° C. was measured in the same manner as in Example 1. The results are shown in FIG. 5.

Figure 5:
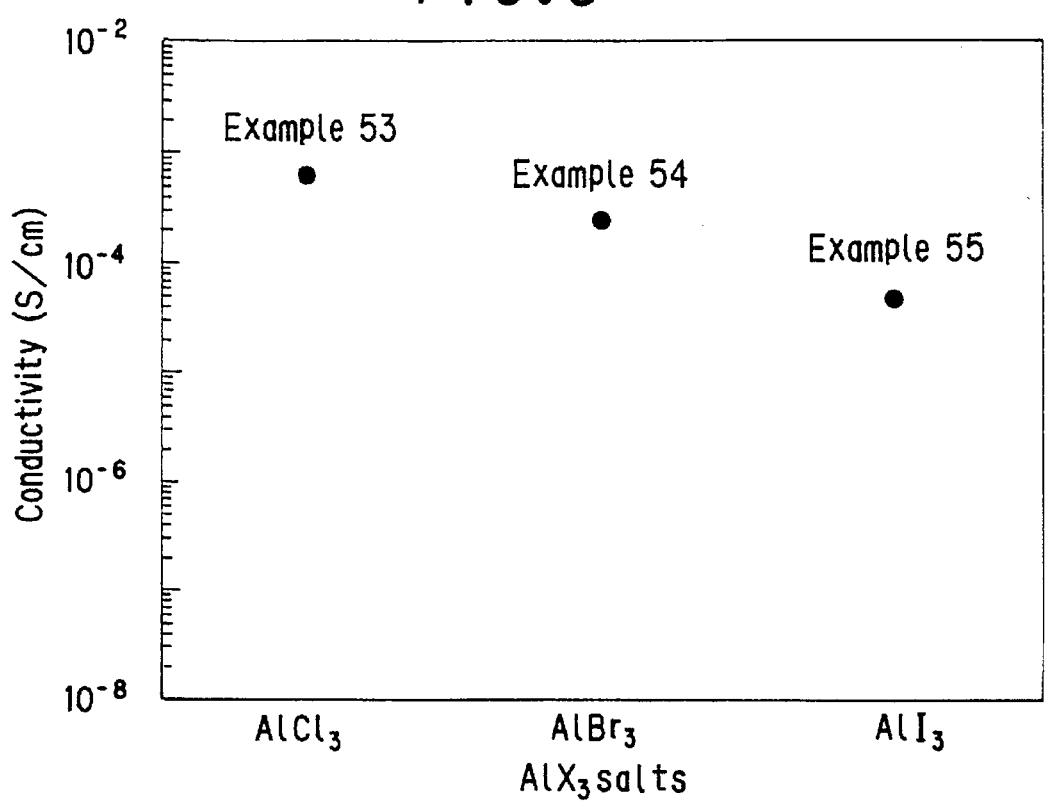
FIG. 5 shows the relationship between the conductivity of the polymer solid electrolyte films obtained in the examples mentioned hereafter and the aluminium halide in the films.

From FIG. 5, it is known that when the halide ions of the aluminium halide to be contained in the polymer solid electrolyte films were changed to $Cl^-$, $Br^-$ and $I^-$, then the conductivities of the films somewhat lowered in this order but were still high in the level of about $10^{-4}$ S/cm. This means that all these halide ions well act as carriers.

EXAMPLES 56 to 59

The general procedure of Example 4 was repeated except that copolymers (Organic Polymers C to F) were used, in place of PDAEC (Organic Polymer A), in the manner as indicated in Table 5, thereby forming polymer solid electrolyte films.

TABLE 5

| Copolymer Solid Electrolyte Films | | | |
|---|---|---|---|
|  | Co-polymer | Composition (as molar ratio) —$NR_3Cl:BPC:AlCl_3$ | Condition of Film |
| Example 56 | C | 1.00:0.30:0.70 | transparent, flexible, self-supporting film |
| Example 57 | D | 1.00:0.30:0.70 | transparent, flexible, self-supporting film |
| Example 58 | E | 1.00:0.30:0.70 | transparent, flexible, self-supporting film |

TABLE 5-continued

| Copolymer Solid Electrolyte Films | | | |
|---|---|---|---|
|  | Co-polymer | Composition (as molar ratio) —$NR_3Cl:BPC:AlCl_3$ | Condition of Film |
| Example 59 | F | 1.00:0.30:0.70 | transparent, flexible, self-supporting film |

The condition of the polymer solid electrolyte films obtained was visually observed at room temperature. As a result, all these films were found colorless, transparent and highly flexible. Referring to the monomers constituting the copolymer to be used as the organic polymer, the polymer solid electrolyte film (Example 57), to which Organic Polymer C containing 10 mol % of PEM4 had been added, was more flexible than the polymer solid electrolyte film (Example 56), to which Organic Polymer C containing 5 mol % of PEM4 had been added; and the polymer solid electrolyte film (Example 58), to which the copolymer containing PEM9 having a longer polyether structure had been added, was more flexible than the polymer solid electrolyte film (Example 56), to which the copolymer containing PEM4 had been added. From these, it is known that the flexibility of the polymer solid electrolyte film may be improved higher when the content of the copolymerizing monomer PEM4 or PEM9 constituting the copolymer to be in the film is elevated and when the length of the polyether structure at the side chain of the copolymerizing monomer constituting the copolymer to be in the same is prolonged.

Figure 6:
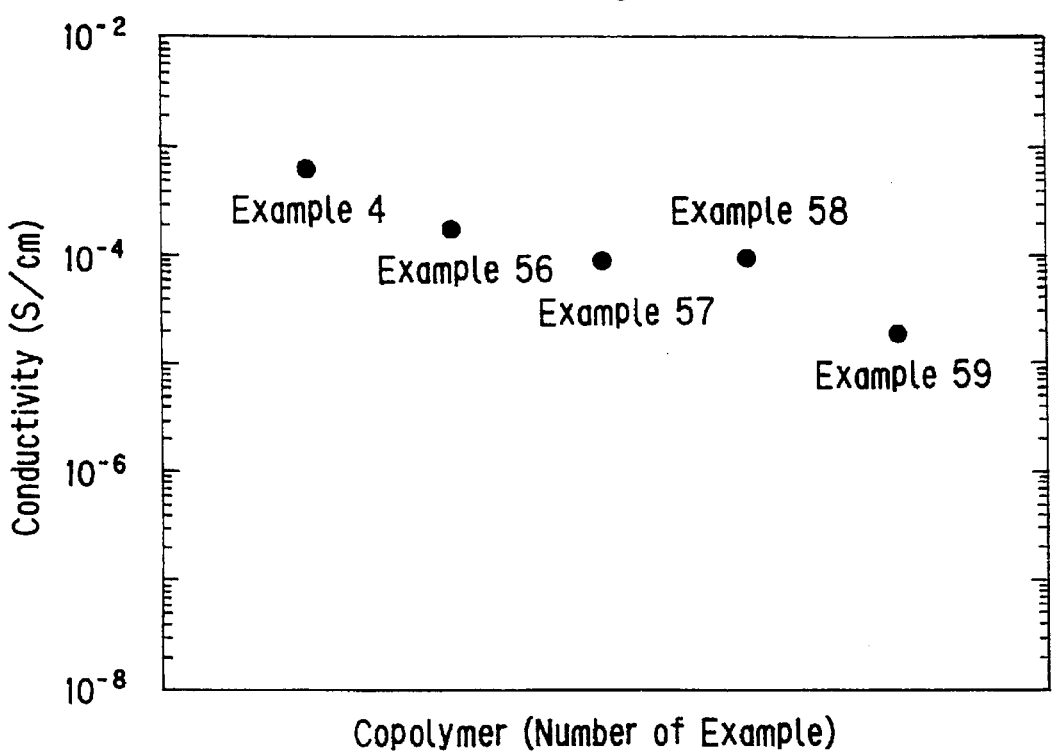
FIG. 6 shows the relationship between the conductivity of the polymer solid electrolyte films obtained in the examples mentioned hereafter and the copolymer in the films.

The ionic conductivity of these polymer solid electrolyte films thus obtained were measured at 30° C., in the same manner as in Example 1. The results are shown in FIG. 6. For reference, the ionic conductivity of the film of Example 4 is also shown in FIG. 6.

From FIG. 6, it is known that the conductivity of the polymer solid electrolyte film is lowered when the content of the copolymerizing monomer PEM4 or PEM9 constituting the copolymer to be in the film is elevated and when the length of the polyether structure at the side chain of the copolymerizing monomer constituting the copolymer to be in the same is prolonged.

EXAMPLES 60 to 63

The general procedure of Example 1 was repeated except that PDMPC having a mean molecular weight of 500,000 was used as the organic polymer and that the content of the DMPC units constituting PDMPC as well as the proportions of BPC and $AlBr_3$ were varied to those as indicated in Table 6, thereby forming polymer solid electrolyte films.

TABLE 6

| PDMPC/BPC/AlCl$_3$ Polymer Solid Electrolyte Films | | | | | |
|---|---|---|---|---|---|
|  | DMPC unit (mol %) | BPC (mol %) | AlCl$_3$ (mol %) | DMPC:BPC:AlCl$_3$ (molar ratio) | Condition of Film |
| Example 60 | 5 | 65 | 30 | 1:13:6 | sticky, gel-like film |
| Example 61 | 10 | 60 | 30 | 1:6:3 | transparent, flexible, self-supporting film |
| Example 62 | 15 | 55 | 45 | 1:3.67:3 | transparent, flexible, self-supporting film |
| Example 63 | 20 | 23 | 70 | 1:1.25:3.5 | transparent, flexible, self-supporting film |

The condition of the polymer solid electrolyte films obtained was visually observed at room temperature. The results have been shown in Table 6 above.

Figure 7:
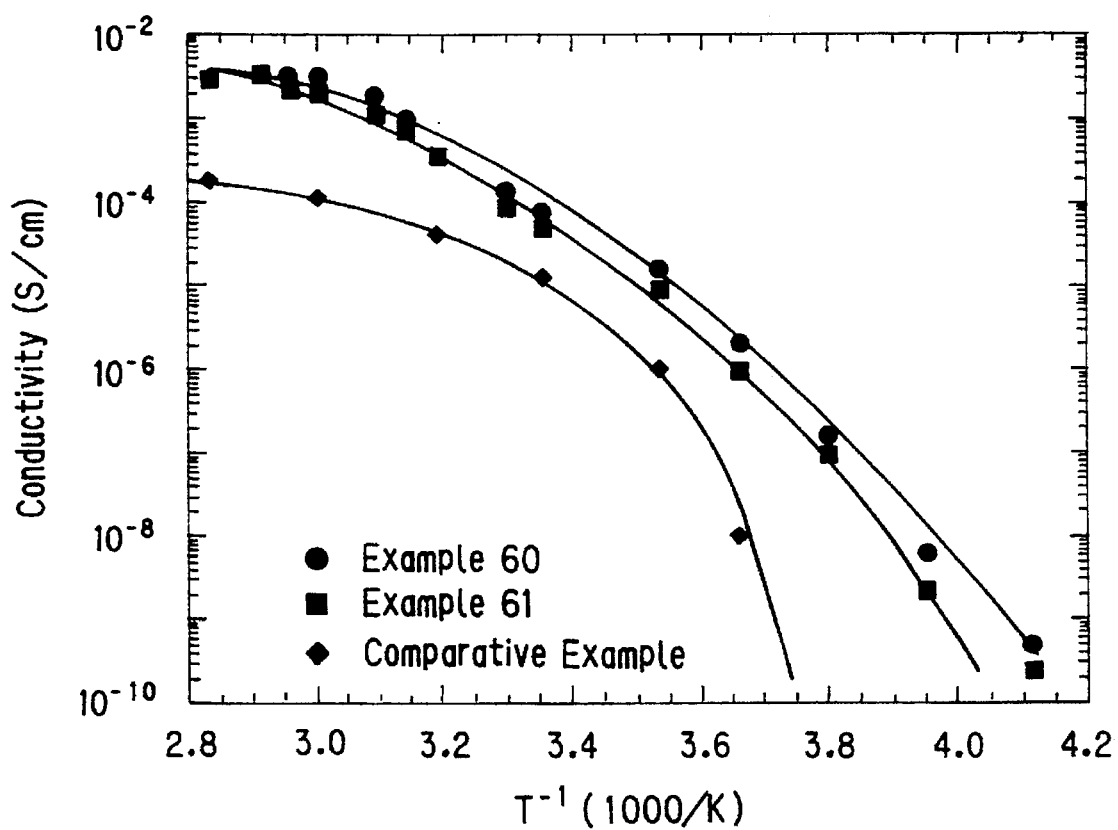
FIG. 7 shows the temperature-dependent variation in the conductivity of the polymer solid electrolyte films obtained in the examples mentioned hereafter.

In addition, the conductivities of these film were measured in the same manner as in Example 1, and the thus-measured data of their conductivities σ were plotted in an Arrhenius' diagram (1/T vs. logσ). FIG. 7 shows the plotted results. For comparison, the conductivity of a polymer solid electrolyte film containing PEO and LiClO$_4$ ([Li+]/[EtO unit]=0.02) was also plotted in the same Arrhenius' diagram of FIG. 7.

From FIG. 7, it is known that the conductivities of the polymer solid electrolyte films of Examples 60 and 61 were high to be not lower than $10^{-3}$ S/cm at room temperature and therefore these films had extremely excellent conductive characteristics.

According to this invention that has been described in detail hereinabove, it is possible to obtain polymer solid electrolytes which are free from electronic conduction and which have a high ionic conductivity even at temperatures near to room temperature and have good film-forming properties, mechanical strength and flexibility. Therefore, the polymer solid electrolytes of this invention are useful as materials in preparing wholly-solid cells and other electrochemical devices.

While the invention has been described in detail and with reference to specific embodiments thereof, it will be apparent to one skilled in the art that various changes and modifications can be made therein without departing from the spirit and scope thereof.

What is claimed is:

1. A polymer solid electrolyte composition comprising:
    an organic polymer having an alkyl quaternary ammonium salt structure of the formula:

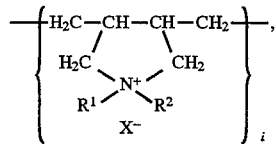

wherein R$^1$ and R$^2$ are alkyl groups, X$^-$ is a counter ion and i is a positive integer;
    a nitrogen-containing, heterocyclic quaternary ammonium salt; and
    a metal salt.

2. A polymer solid electrolyte composition as defined in claim 1, wherein said organic polymer comprises N, N-dimethyl-3-pyrrolinium chloride units.

3. A polymer solid electrolyte composition as defined in claim 1, wherein X$^-$ is selected from the group consisting of Cl$^-$, Br$^-$ and I$^-$.

4. A polymer solid electrolyte composition as defined in claim 1, wherein said organic polymer has a mean molecular weight of from about 20,000 to about 500,000.

5. A polymer solid electrolyte composition as defined in claim 1, wherein said nitrogen-containing, heterocyclic quaternary ammonium salt comprises butyl pyridinium chloride.

6. A polymer solid electrolyte composition as defined in claim 1, wherein said metal salt is selected from the group consisting of AlCl$_3$, AlBr$_3$ and AlI$_3$.

7. A polymer solid electrolyte composition as defined in claim 2, wherein the nitrogen-containing, heterocyclic quaternary ammonium salt is butyl pyridinium chloride, the metal salt is AlCl$_3$ and the ratio of components is such that the N, N-dimethyl-3-pyrrolinium chloride unit content is from about 5 to about 20 mol %, the butyl pyridinium chloride content is from about 25 to 50 mol % and the AlCl$_3$ content is from about 30 to about 70 mol %.

8. A method for making a polymer solid electrolyte film comprising the steps of:

preparing a solution of an organic polymer having an alkyl quaternary ammonium salt structure of the formula:

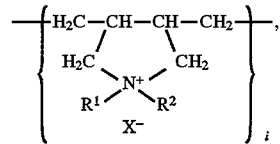

wherein R$^1$ and R$^2$ are alkyl groups, X$^-$ is a counter ion and i is a positive integer, a nitrogen-containing, heterocyclic quaternary ammonium salt, a metal salt and an organic solvent; and casting the solution to form a film.

9. A method as defined in claim 8, wherein the organic solvent is selected from alcohols or nitromethane.

* * * * *